United States Patent Office 3,667,953
Patented June 6, 1972

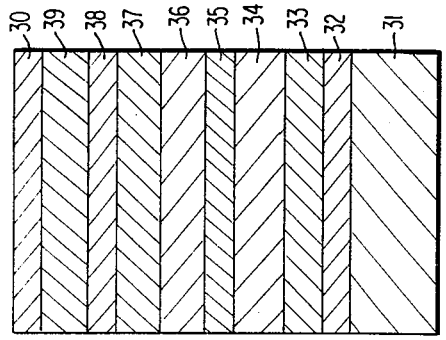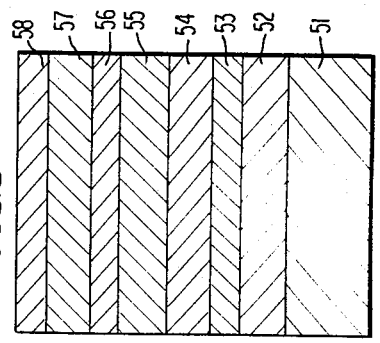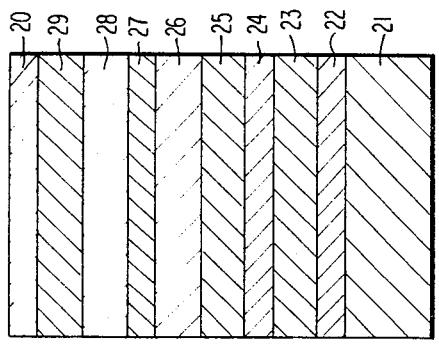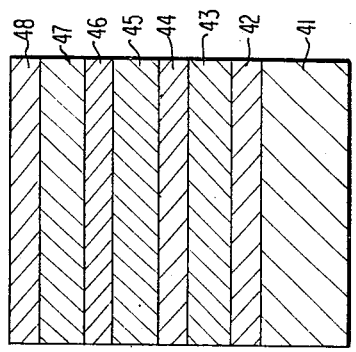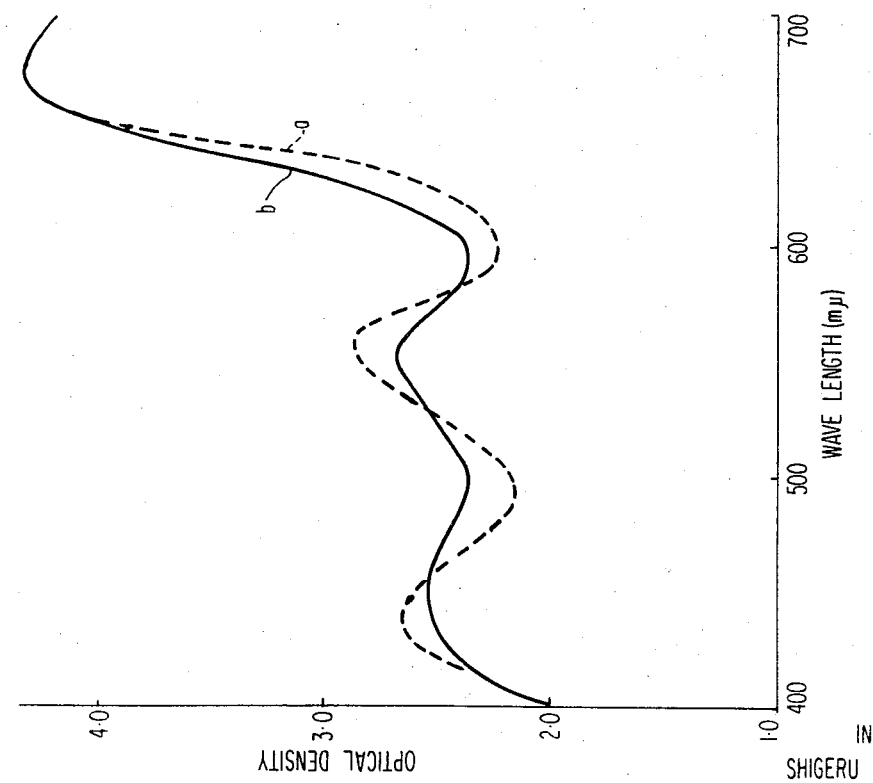

3,667,953
COLOR PHOTOGRAPHIC POSITIVE MATERIALS
Shigeru Watanabe, Yukio Yasuda, and Kazuya Sano, Kanagawa, Japan, assignors to Fuji Photo Film Co., Ltd., Kanagawa, Japan
Filed Mar. 25, 1970, Ser. No. 22,468
Claims priority, application Japan, Oct. 9, 1969, 44/80,987
Int. Cl. G03c 1/76
U.S. Cl. 96—74                                       7 Claims

ABSTRACT OF THE DISCLOSURE

Multi-layer color photographic light-sensitive positive material incorporating, in addition to cyan, magenta and yellow dyes in the light-sensitive emulsion layers thereof, at least one of a red or blue dye-forming coupler capable of forming a dye or dyes having absorption maximums at 460–520 nm. and 570–640 nm., respectively. Such red and blue dye couplers are selected such that the dyes are formed selectively in high density images areas and result in the production of images possessing excellent reproduction of both colors and black.

BACKGROUND OF THE INVENTION

(1) Field of the invention

The present invention relates to color photography and more particularly to multi-layer-type color photographic light-sensitive materials. Furthermore, the invention is concerned with a novel color mixing method for forming color images and also it is concerned with a novel color mixing method for providing excellent color and black reproduction having a high visual density to color photographic positive images of color photographic light-sensitive films or papers.

(2) Description of the prior art

Many processes are known for producing color photographic positive images. Among them, the process which is being generally utilized at present is a subtractive color process based on a three primary color theory.

The dyes forming the color photographic image in the subtractive color process are a yellow dye having an absorption maximum at about 420–460 nm., a magenta dye having an absorption maximum at about 520–570 nm., and a cyan dye having an absorption maximum at about 640–700 nm. However, in practice, the spectral absorption curves of the dyes employed are broad. That is, the dyes have some undesirable absorption in regions other than those necessary absorption regions. The presence of such undesirable absorption characteristics of the dyes causes severe reduction in color saturation of the color photographic positive image reproduced.

Therefore, in order to obtain high color saturation, there have been proposed dyes having spectral absorption curves as sharp as possible and possessing less undesirable absorptions. However, the use of such dyes is accompanied by certain disadvantages. That is, in the reproduction of a black portion of a positive image by the mixing of three dyes, the spectral absorption curve of the black obtained by color mixing is not flat, but is largely dependent on wave length as shown by curve (a) in FIG. 1 of the accompanying drawings. This effect reduces the visual density of the black part of the image. Accordingly, the use of large amounts of such dyes is required in order to obtain blacks having a high visual density. Thus, if it is desired to increase the color saturation of a color photographic positive image reproduced and also improve the visual density of the block portions thereof, not only are large amounts of dyes required, which is uneconomical, but also, in the case of a multi-layer-type color photographic light-sensitive material, the thickness of the light-sensitive emulsion layers containing the dyes must be increased, which reduces the sharpness of the image obtained.

SUMMARY OF THE INVENTION

Therefore, it is an object of the present invention to provide a color photographic light-sensitive positive material forming a color photographic positive image having a high visual density of black portions without reducing the color saturation of the color image reproduced.

Another object of this invention is to provide a method of producing such a multi-layer-type color photographic light-sensitive material as mentioned above.

As shown by curve (a) in FIG. 1, of the accompanying drawings, the spectral absorption curve of blacks obtained by mixing dyes of the three primary colors in the subtractive color process has valleys of absorption, or wave length regions having a high transmittance at about 500 nm. and about 600 nm. whereby the visual density of the black portions are reduced.

According to the present invention, the valleys of absorption of black as mentioned above are compensated for by the addition of red and blue dyes, having spectral absorption maximums near 500 nm. and 600 nm., respectively, to the dye mixture of the three primary colors, i.e., a mixture of a cyan dye, a magenta dye and a yellow dye.

It is necessary that these red and blue dyes are formed only at high density portions of the color image and that they not be substantially formed at low density portions of the image.

DETAILED DESCRIPTION OF THE INVENTION

In the color photographic positive material of the present invention, at least one of a red dye having an absorption maximum within a spectral wave length region of from 460 nm. to 520 nm. and a blue dye having an absorption maximum within a spectral wave length region of from 570 nm. to 640 nm., is added to a dye mixture of cyan, magenta and yellow dyes forming three primary colors in the subtractive color process at image portions having an equivalent neutral density of higher than 1.2 in a transparent color photographic material, or an equivalent neutral reflection density of higher than 0.8 in a reflective photographic material, to provide a color image, whereby a high visual density is obtained in the black portions of image.

Accordingly, the color photographic positive images by the present invention may be composed of a dye mixture of a cyan dye, a magenta dye, a yellow dye, the red dye, and the blue dye; a dye mixture of a cyan dye, a magenta dye, a yellow dye, and the red dye; or a dye mixture of a cyan dye, a magenta dye, a yellow dye, and the blue dye.

As mentioned above, if a black color is formed by the mixture of cyan, magenta and yellow dyes, forming the three primary colors in subtractive color process, the spectral absorption curve of the dye mixture is as curve (a) of FIG. 1. That is, the difference in absorption density by wave length is large. This results in the disadvantage that when the black color formed by such a dye mixture is viewed, the color reproduced is varied according to the color of the light source employed.

On the other hand, the black part of the image reproduced by a color photographic positive material having either the four or five kinds of dyes of the present invention has a spectral absorption curve such as (b) of FIG. 1, which is flatter than the spectral absorption curve (curve (a) of FIG. 1) of the black part composed of the conventional three primary colors, and the black color of the image is less dependent on the color of the light source employed for viewing.

The present invention is effectively applied to prior art dye systems such that the spectral absorption curves of the cyan, magenta and yellow dyes forming the three primary colors in the subtractive color process are rendered sharp. For example, the spectral absorption curve of a dye formed in a silver halide photographic emulsion layer having dispersed therein an oil-soluble coupler is generally sharper than that of the same dye formed in a photographic silver halide emulsion layer containing a water-soluble coupler and the method of the present invention is particularly effective for forming the black image portions by dye mixtures formed from such oil-soluble couplers.

The red dye to be mixed with the dye mixture of three primary colors in the subtractive color process, according to the present invention, is a dye having an absorption maximum within a spectral wave length region of from 460 nm. to 520 nm. a dye having a sharp spectral absorption curve is more effective than a dye having a broad spectral absorption curve. The blue dye employed in the present invention is one having an absorption maximum within a spectral wave length region of from 570 nm. to 640 nm. and, likewise, a blue dye having a sharper spectral absorption curve is more effective.

Further, in the materials of the present invention, a gray dye, having absorption maximums at spectral wave length regions of from 460 nm. to 520 nm. and also from 570 nm. to 640 nm. may be employed instead of employing the aforementioned red and blue dyes.

The light sensitive emulsion layer forming the red dye or the blue dye of the present invention may be a blue-sensitive emulsion layer, a green-sensitive emulsion layer, or a red-sensitive emulsion layer. However, considering reproduction of flesh colors and red, which are particularly important in the reproduction of color photographic positive images, it is desirable to form the red dye in a blue-sensitive emulsion layer or a green-sensitive emulsion layer. Further, it is desirable to form the blue dye in a green-sensitive emulsion layer or a red-sensitive emulsion layer.

In the case of multilayer-type color photographic light-sensitive materials having a light-sensitive emulsion layer in which the red dye or the blue dye is formed independently of the light-sensitive emulsion layers in which the above-mentioned three dyes are formed, these light-sensitive emulsion layers may be applied to a support in various orders. For example, in the case of employing five light-sensitive emulsion layers, the emulsions may be applied to a support in the order of cyan, blue, magenta, red, yellow; cyan, blue, red, magenta, yellow; yellow, cyan, blue, red, magenta; yellow, blue, cyan, red, magenta; yelloy, cyan, red, blue, magenta; yelloy, magenta, blue, red, cyan; yellow, red, magenta, blue, cyan, or yellow, blue, red, cyan, magenta. In the case of a four dye system, the red dye-forming emulsion layer or the blue dye-forming emulsion layer may be omitted from the above-mentioned layer constructions. In this case, by decreasing the sensitivity of the light-sensitive emulsion layer forming the red or blue dye by less than ½ the sensitivity of the light-sensitive emulsion layers forming the other dye of the primary color having the same light-sensitive wave length regions, the red or blue dye images can be selectively produced only at the desired high density portions of the image.

Furthermore, the red or blue dye images may be formed in a light-sensitive emulsion layer forming a cyan, magenta or yellow dye. For instance, in a color photographic positive material forming a dye image by the coupling reaction of an oxidized primary aromatic amine developer with a coupler, the coupler forming the red image or the blue image may be incorporated in a light-sensitive emulsion layer containing the coupler forming the dye image of the primary color. Thus, in a green-sensitive gelatino silver halide emulsion layer, may be incorporated a magenta-forming coupler and a red-forming coupler or a blue-forming coupler. In this case, since it is necessary that the red or blue dye be produced only at the high density portions of the magenta dye image formed in the green-sensitive layer a red or blue-forming coupler is employed having a coupling rate which is 0.1–0.6 of the coupling rate of the magenta-forming coupler.

The present invention differs fundamentally from the disclosures of U.S. Pat. No. 2,592,514 and Japanese patent publication No. 3,481/58 because in these prior disclosures, the silver halide emulsion layer contains a coupler forming a primary color and small quantity of the two other couplers forming the other primary colors to provide a gray component in the image composed of the dyes of three primary colors, while in the present invention, a coupler forming a red dye and/or a coupler forming a blue dye is used besides the couplers forming the dyes of the three primary colors to reproduce black effectively. Accordingly, as only the couplers forming the three primary colors in a subtractive color process are used in these prior methods, the afore-mentioned disadvantage that the black color is observed as a different color when the color of the viewing light source is changed is not overcome by such prior known methods.

The present invention also differs fundamentally from the methods disclosed in British Pats. 1,160,524 and 1,160,525 because these inventions relate to color photographic negative materials and the objects of these inventions are to provide a light-sensitive emulsion layer providing an image having neutral printing density for a color photographic positive material at the highlight portions or the shadow portions of an object. Therefore, since the positive image obtained by printing through this color photographic negative image, obtained by the methods of the above-mentioned patents onto an ordinary color photographic positive material, is composed of the dyes of the three primary colors of the subtractive color process, the aforementioned disadvantage that the black color is observed differently when the color of the light source is changed, is not overcome.

The present invention is illustrated in the following examples with reference to a multi layer-type silver halide color photographic light-sensitive material, having light-sensitive layers containing couplers forming color images by coupling reactions with the oxidation product of a p-phenylenediamine derivative. The present invention can, in practice, however, be applied to various kinds of color photographic positive materials, such as the color photographic positive materials used in a silver dye bleaching process, a dye diffusion transfer process, an image transfer process using a dye developer, a color electrophotographic process, or a color developing process utilizing the coupling reactions of the oxidation product of primary aromatic amine developer with couplers. Thus, it will be understood that the application of the present invention is not limited to the materials of the following examples.

EXAMPLE 1

A multi layer-type color photographic printing material having the structure shown in FIG. 2 of the accompanying drawing was prepared as follows. A gelatino colloidal silver composition prepared by the method disclosed in Japanese patent publication No. 27,740/68 was applied to a transparent cellulose acetate film 21, undercoated with gelatin to provide a black anti-halation layer 22. A coating composition prepared by dissolving 15 g. of a yellow-forming coupler, α-(2-methylbenzoyl)-2-chloro-5-

(n - hexadecyloxycarbonyl)acetanilide represented by Formula I:

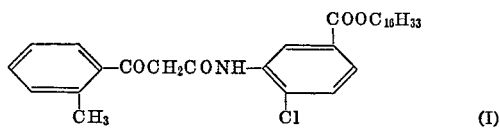

in 20 ml. of butyl phthalate, dispersing the resultant solution in aqueous 5% gelatin solution, and adding the dispersion to 500 g. of a hard tone, fine-grain, silver iodobromide emulsion (containing 0.2 mole of silver) having a sensitivity to light of 400–480 nm. and containing 1 mole percent iodide, was applied to the antihalation layer 22 to provide a blue-sensitive emulsion layer. To the emulsion layer was applied an aqueous gelatin solution to provide an intermediate layer 24. Then, a coating composition prepared by dissolving 17 g. of a blue-forming coupler, 2 - [γ-(2,4-dietertiary-amylphenoxy)butylamide]-5-hexamide phenol (II)

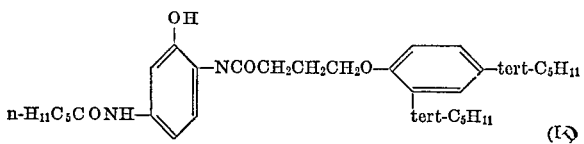

in a solvent mixture of 20 ml. of butyl acetate and 20 ml. of cresyl phosphate, dispersing the solution thus prepared in aqueous 10% gelatin solution, and adding the dispersion to 500 g. of a low-sensitive, hard-tone, fine grain, silver chlorobromide emulsion (containing 0.2 mole of silver) containing 40 mole percent bromide and spectrally sensitized so that the emulsion had a maximum sensitivity at 550 nm., was applied to the intermediate layer 24 to provide a green-sensitive layer 25. The green sensitivity of the green-sensitive emulsion layer 25 was about ½ of that of the green-sensitive layer 29. Thereafter, a coating composition prepared by dissolving 25 g. of a cyan-forming coupler, 1-hydroxy-4-chloro-N-n-hexadecyl-2-naphthamide (III)

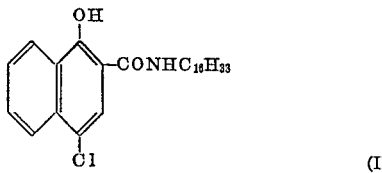

in a mixture of 30 ml. of butyl acetate and 30 ml. of butyl phthalate, dispersing the solution in aqueous 10% gelatin solution, and adding the dispersion to 500 g. of a hard-tone, fine-grain, silver chlorobromide emulsion (containing 0.2 mole of silver) containing 35 mole percent bromide and spectrally sensitized so that the silver halide emulsion had a maximum sensitivity at 680 nm., was applied to the green-sensitive emulsion layer 25 to provide a red-sensitive layer 26. To the emulsion layer 26 was applied an aqueous gelatin solution to provide an intermediate layer 27. Then, a coating composition prepared by dissolving 12.5 g. of a red-forming coupler, m - [α-(2,4-di-tertiary-amylphenoxy)acetamide-α-cyanoacetanilide (IV)

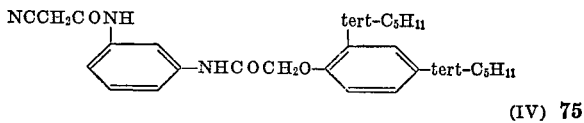

in a mixture of 20 ml. of cresyl phosphate and 30 ml. of butyl acetate, dispersing the solution in aqueous 10% gelatin solution, and adding the dispersion to 500 g. of a low-sensitive, hard-tone, fine-grain, silver chlorobromide emulsion (containing 0.2 mole of silver) containing 40 mole percent bromide and spectrally sensitized so that the silver halide emulsion had a maximum sensitivity at 550 nm., was applied to the intermediate layer 27 to provide a green-sensitive layer 28. The green sensitivity of the green-sensitive layer 28 was about ½ of the green-sensitive layer 29 shown below. Thereafter, a coating composition prepared by dissolving 17.5 g. of a magenta-forming coupler, 1 - (2,6 - dichloro-4-methoxyphenyl)-3-{3[α - (2,4 - di-tertiary-aminophenoxy)butylamido]phenylureido}-5-pyrazolone (V)

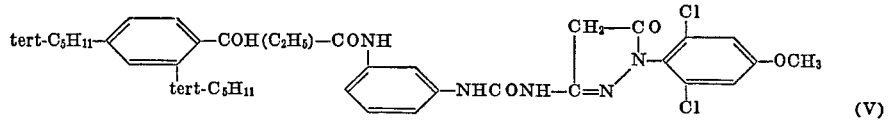

in a mixture of 10 ml. of butyl phthalate and 40 ml. of ethyl acetate, dispersing the solution thus prepared in aqueous 10% gelatin solution, and adding the resultant dispersion to 500 g. of a hard-tone, fine-grain, silver chlorobromide emulsion (containing 0.2 mole of silver) containing 40 mole percent bromide and sensitized so that the silver halide emulsion had a maximum sensitivity at 550 nm., was applied to the green-sensitive layer 28 to provide a green-sensitive emulsion layer 29. To the emulsion layer 29 was applied a coating composition prepared by dispersing liquid paraffin and an un-post-ripened silver chloroiodo-bromide emulsion containing silver halide particles of 1.0 micron in mean grain size in an aqueous gelatin solution to provide a protective layer 20.

The color photographic positive printing film was exposed through a color photographic negative image and then subjected to the following photographic procedures at a temperature of 20° C. in each processing.

Color development: 15 min.
Water washing: 1 min.
Fixing: 4 min.
Water washing: 4 min.
Bleaching: 8 min.
Water washing: 6 min.
Fixing: 4 min.
Water washing: 8 min.
Drying (air drying): 30° C.

The processing compositions used in the above processings were as follows:

Color developer:
  Sodium hexametaphosphate: 2 g.
  Anhydrous sodium sulfite: 4 g.
  4-amino-3-methyl-N,N-diethyl aniline sulfate: 3 g.
  Sodium carbonate monohydrate: 20 g.
  Potassium bromide: 2 g.
  Water to make 1 liter.

Fixing solution:
  Anhydrous hypo: 150 g.
  Anhydrous sodium sulfite: 15 g.
  28% acetic acid: 48 ml.
  Potassium alum: 15 g.
  Water to make 1 liter.

Bleaching solution:
  Potassium bromide: 20 g.
  Potassium bichromate: 5 g.
  Potassium alum: 40 g.
  Anhydrous sodium acetate: 2.5 g.
  Glacial acetic acid: 60 ml.
  Water to make 1 liter.

The spectral absorption curve of the black part of the photographic film thus processed was as curve (b) in FIG. 1 of the accompanying drawing, which was flat as compared with the spectral absorption curve (curve (a) in FIG. 1) of the black part of the image composed of cyan, magenta, and yellow dyes.

EXAMPLE 2

A multi layer-type color photographic reversal camera film having the structure shown in FIG. 3 was prepared in the following manner.

A coating composition prepared by dissolving 43 g. of a blue-forming coupler, 5-benzamido-2[α-(2,4-di-tertiary-amylphenoxy)butylamido]-phenol (VI)

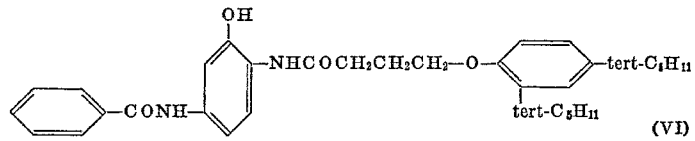

in a mixture of 65 ml. of butyl phosphate and 40 ml. of butyl phthalate, dispersing the solution in an aqueous gelatin solution, and adding the dispersion thus prepared to 1 kg. of a fine grain silver iodobromide emulsion (containing 0.5 mole of silver) containing 7 mole percent iodide, was applied a support 31 as used in Example 1 having an antihalation layer 32 to provide a red-sensitive emulsion layer 33. The red sensitivity of the red-sensitive layer 33 was about 1/30 of that of the red sensitive layer 34 shown below. Thereafter, a coating composition prepared by dissolving 100 g. of a cyan-forming coupler, 4,6-dichloro-5-methyl-2-[α-(2,4-di-tertiary-amylphenoxy)butylamido]-phenol (VII)

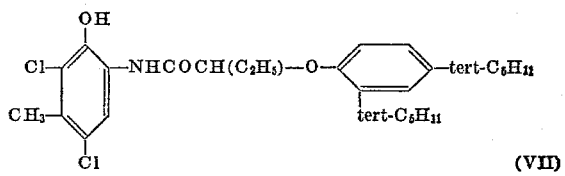

in 100 ml. of butyl phthalate and 150 ml. of butyl phosphate, dispersing the solution in aqueous 10% gelatin solution, and adding the dispersion to 1 kg. of a high-sensitive silver iodobromide emulsion (containing 0.5 mole of silver) containing 7 mole percent iodide and spectrally sensitized with 5,5'-dichloro-3,3'-disulfopropyl-9-ethyl-thiacarbocyanine pyridinium salt and 3,3'-disulfopropyl - 9 - ethyl-4,5,4',5'-dibenzothiacarbocyanine pyridinium salt, was applied to the red-sensitive emulsion layer to provide a red-sensitive emulsion layer 34. To the red-sensitive emulsion layer was applied a coating composition prepared dispersing a solution of 2,5-di-tertiary-butyl-1,4-hydroquinone in cresyl phosphate in aqueous 10% gelatin solution to provide an intermediate layer 35. A coating composition prepared by dissolving 40 g. of a red-forming coupler 1-(α-sulfoheptadecylamido) - 3 - (α-cyanoacetamido)-benzene (VIII)

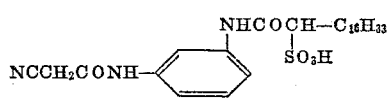

in an alkaline solution and then adding the solution to 1 kg. of a hard-tone silver iodobromide emulsion (containing 0.4 mole of silver) containing 4 mole percent iodide and spectrally sensitized with 5,5'-diphenyl-3,3'-disulfobutyl - 9 - ethyl-oxacarbocyanine potassium salt, was applied to the intermediate layer 35 to provide a green-sensitive emulsion layer 36, the green sensitivity of which was about 1/30 of that of the green-sensitive layer shown below. Thus, a coating composition prepared by dissolving 21 g. of a magenta-forming coupler, 1 - (2,4,6 - trichlorophenyl) - 3 - [β - (N-butyl-hexadecylamido)-propioneamido]-5-pyrazolone (IX)

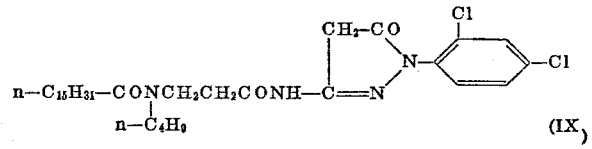

in a mixture of 20 ml. of cresyl phosphate and 40 ml. of butyl acetate, dispersing the solution in aqueous 10% gelatin solution, and adding the dispersion thus prepared to 1 kg. of a high-sensitive silver iodobromide emulsion (containing 0.4 mole of silver) containing 8 mole percent iodide and spectrally sensitized with 5,5'-diphenyl-3,3'-disulfobutyl-9-ethyl-oxacarbocyanine potassium salt and 1,3,1',3'-tetraethyl - 5,6,5',6' - tetrachlorobenzoimidazolo-carbocyanine perchlorate, was applied to the green-sensitive layer 36 to provide a green-sensitive emulsion layer 37. To the emulsion layer 37 was applied a yellow colloidal silver solution prepared by reducing silver nitrate in an aqueous gelatin solution with dextrine to provide a yellow filter layer 38. Thereafter, a coating composition prepared by dissolving 45 g. of a yellow-forming couper, α-(2-methyl-benzoyl)-3-[α - (2,4 - ditertiary-amylphenoxy)acetamido]-acetanilide (X)

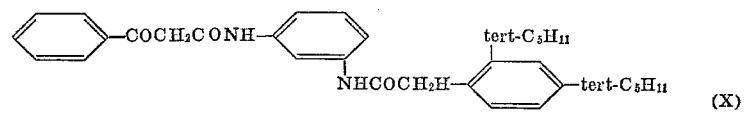

in a mixture of 60 ml. of butyl phosphate and 90 ml. of ethyl acetate, dipersing the solution in aqueous 5% gelatin solution, and adding the ispersion to 1 kg. of a high-sensitive silver iodobromide emulsion (containing 0.5 mole of silver) containing 5 mole percent diode, was applied to the yellow filter layer 38 to provide a blue-sensitive layer 39. On to the layer 39 was applied a coating composition prepared by dispersing butyl phthalate in an aqueous gelatin solution to provide a protective layer 30.

The multi layer-type color photographic light-sensitive film thus prepared was subjected to a camera exposure and then to the following photographic processings at 24° C.

Back and white development: 10 min.
Water washing: 30 sec.
Hardening stopping: 5 min.
Reversal exposure: 1 min. by a tungsten lamp of 100 watts from a distance of 1 meter.
Water washing. 3 min.
Color development: 15 min.
Water washing: 5 min.
Cleaning: 5 min.
Water washing: 1 min.
Bleaching: 8 min.
Water washing: 1 min.
Fixing: 3 min.
Water washing: 8 min.

The compositions of the processing solution used in the Black and white developer: above processings were as follows.

| | |
|---|---|
| Anhydrous sodium sulfite | 30 |
| 4-(N-methylamino)phenol sulfate | 2.6 |
| Hydroquinone | 5.2 |
| Sodium carbonate monohydrate | 29 |
| Potassium bromide | 1.8 |
| Water to make 1 liter. | |

Hardening stopping solution:
| | |
|---|---|
| Chromium alum | 30 |
| Water to make 1 liter. | |

Color developer:
| | |
|---|---|
| Sodium hydroxide | 6.3 |
| Sodium phosphate | 40 |
| Anhydrous sodium sulfite | 2 |
| 4-amino-3-methyl - N - ethyl-N-methane sulfoneamidoethylaniline sulfate | 10 |
| Ethylenediamine sulfate | 8 |
| Wate to make 1 liter. | |

Cleaning solution:
| | |
|---|---|
| Crystalline hypo | 160 |
| Potassium metabisulfite | 10 |
| Anhydrous sodium dihydrogen phosphate | 4.5 |
| Water to make 1 liter. | |

Bleaching solution:
| | |
|---|---|
| Potassium ferricyanide | 60 |
| Potasium bromide | 30 |
| Water to make 1 liter. | |

The composition of the fixing solution was same as that in Example 1.

The spectral absorption curve of the black part of the photographic film thus processed was flat as in Example 1 as compared with the image obtained by the dye mixture of the three primary colors.

EXAMPLE 3

A multi layer-type color photographic printing material having the structure shown in FIG. 4 of the accompanying drawings was prepared as follows.

To a support 41 as in Example 1 were formed an antihalation layer 42, a blue-sensitive emulsion layer 43, and an intermediate layer 44 were applied as in Example 1. To the intermediate layer was further applied a red-sensitive layer 45 having the same composition as that of the red-sensitive layer 26. To the red-sensitive layer was applied an intermediate layer 46 having the same composition as that of the intermediate layer 27 in Example 1. Thereafter, a coating composition prepared by dissolving 18 g. of a magenta-forming agent, 1-(2,4,6-trichlorophenyl)-3{3-[α - (2,4 - di-tertiary-amylphenoxy)butylamido]benzamido}-5-pyrazolone (XI).

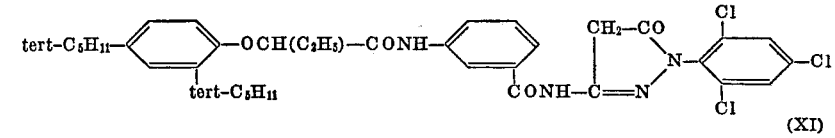

(XI)

and 5 g. of a red-forming coupler, m-[α-(2,4-di-tertiaryamyl-phenoxy)butylamido]-α-cyanoacetanilide (XII)

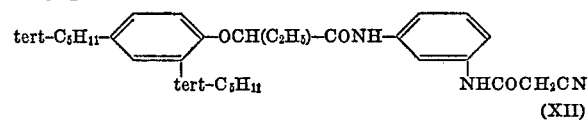

(XII)

in a mixture of 20 ml. of butyl-phthalate and 80 ml. of ethyl acetate, dispersing the solution in aqueous 10% gelatin solution, and adding the dispersion thus prepared to 500 g. of a hard-tone fine-grain silver chlorobromide emulsion (containing 0.2 mole of silver) containing 35 mole percent bromide and spectrally sensitized to about 550 nm., was applied to the intermediate layer 46 to provide a green-sensitive emulsion layer 47. To the emulsion layer was applied a protective layer 48 having the same composition as that of the protective layer 30 in Example 2. The photographic film thus prepared was processed as in Example 1. The results showed that the spectral absorption curve of the black part of the photographic film thus processed was flat, as in Example 1.

EXAMPLE 4

A multi layer-type color photographic printing paper having the structure shown in FIG. 5 of the accompanying drawings was prepared by the following manner.

A coating composition prepared by dissolving 10 g. of a yellow-forming coupler, α - (2 - methoxybenzoyl) - 2-chloro-5-(n-tetradecyloxycarbonyl)acetanilide (XIII).

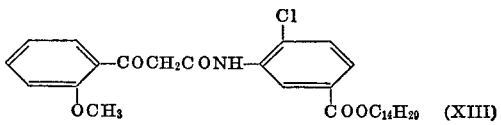

(XIII)

in a mixture of 10 ml. of butyl phthalate and 30 ml. of butyl acetate, dispersing the solution in aqueous 10% gelatin solution, and adding the dispersion thus prepared to 500 g. of silver a chloroiodo-bromide emulsion containing 0.8 mole percent iodide and 5 mole percent chloride (containing 0.15 mole of silver), was applied to a baryta-coated paper 51 to provide a blue-sensitive layer 52. To the blue-sensitive layer was applied an aqueous gelatin solution to provide an intermediate layer 53. Thereafter, a coating composition prepared by dissolving 8 g. of a magenta-forming coupler 1-(2,6-dichloro-4-methylphenyl) - 3 - {3 - [α - 2,4 - di - tertiary - amylphenoxy) butylamido]benzamido}-5-pyrazolone (XIV)

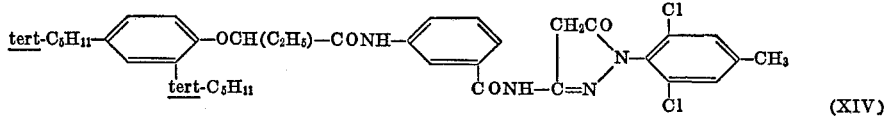

(XIV)

in a mixture of 12 ml. of cresyl phosphate and 16 ml. of ethyl acetate, dispersing the solution in aqueous 10% gelatin solution, and adding the resultant dispersion to 500 g. of a silver chlorobromide emulsion (containing 0.1 mole of silver) containing 30 mole percent bromine, was applied to the intermediate layer 53 to provide a green-sensitive layer 54. Furthermore, a coating composition prepared by dissolving 10 g. of a red-forming coupler, 1 - (α - octadecenyl succinamido) - 3 - (α - cyanoacetamido)benzene (XV)

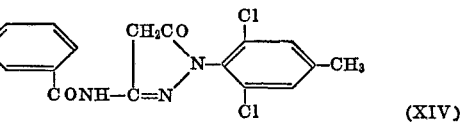

(XV)

in an aqueous alkali solution and adding the resultant solution to 500 g. of a silver chlorobromide emulsion (containing 0.1 mole of silver) containing 30 mole percent bromide and spectrally sensitized with 3,3'-disulfoethyl-5,5'-dichloro-9-ethyl - oxacarbocyanine pyridinium salt, was applied to the green-sensitive layer 54 to provide a green-sensitive layer 55. The green sensitivity of the green-sensitive layer 55 was about ¼ of that of the green-sensitive emulsion layer 54. In the green-sensitive emulsion layer 55 was applied an aqueous gelatin solution to provide an intermediate layer 56. Thereafter, a coating composition prepared by dissolving 18 g. of a cyan-forming coupler, 4,6 - dichloro-5-methyl-2-[α-(2,4-di-tertiary-amylphenoxy)acetamido]-phenol (XVI)

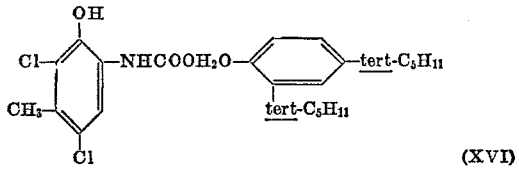

(XVI)

in a mixture of 15 ml. of butyl phthalate and 30 ml. of ethyl acetate, dispersing the solution in aqueous 10% gelatin solution, and adding the dispersion thus prepared to 500 g. of a silver chlorobromide emulsion (containing 0.1 mole of silver) containing 35 mole percent bromide and spectrally sensitized with 5-[β-1-ethylquinoline-4)-ethylidene] - 2 - (3 - ethyl - 4,5 - diphenylthiazolidene-2-methylene)-4-keto-4,5-dihydrothiazole allyliodide, was applied to the intermediate layer 56 to provide a red-sensitive layer 57. To the emulsion layer was applied an aqueous gelatin solution to provide a protective layer 58.

The color photographic printing paper thus prepared was exposed for printing through a color negative and subjected to the photographic processing shown below at 20° C.

| | Min. |
|---|---|
| Color development | 10 |
| Water washing | 1 |
| Fixing | 4 |
| Water washing | 4 |
| Bleaching | 4 |
| Water washing | 4 |
| Fixing | 4 |
| Water washing | 10 |

Drying by hot air at 30° C.

The compositions for the processing solutions used above are as follows.

Color developer: G.
- Anhydrous sodium sulfite _____ 2
- 4 - amino - N-ethyl-N-(β-hydroxyethyl)-aniline hydrochloride _____ 4.2
- Sodium carbonate monohydrate _____ 35
- Hydroxylamine sulfate _____ 1.2
- Potassium bromide _____ 1.5
- Water to make 1 liter.

The composition of the bleaching solution was same as that of the bleaching solution used in Example 2 and that of the fixing solution was same as that of the fixing solution used in Example 1.

The spectral absorption curve of the black part of the photographic print thus obtained was flat, as compared with that of the image composed of the dyes of the three primary colors as in Example 1.

EXAMPLE 5

The same procedure as Example 3 was followed to prepare a multi layer-type color photographic positive printing material with the exception that the green-sensitive emulsion layer 47 was formed by applying to the intermediate layer 46 a coating composition prepared by dissolving 16 g. of a magenta-forming coupler, 1-phenyl-3 - [3-(α-octadecenyl succinamido)benzamido]-5-pyrazolone (XVII)

and 4 g. of a blue-forming coupler, 1-[4-(α-octadecenyl succinamido)phenyl] - 3 - trifluoromethyl - 5-pyrazolone (XVIII)

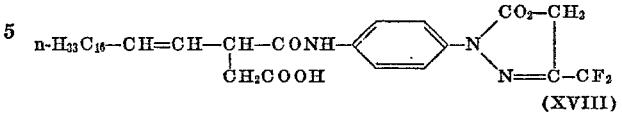

(XVIII)

in an aqueous alkali solution, adding the resulting solution to a dispersion in an aqueous gelatin solution of a solution of 6 g. of a red-forming coupler, 4-[α-(2,4-di-tertiary-amylphenoxy)butylamido]cyanoacetylbenzene (XIX)

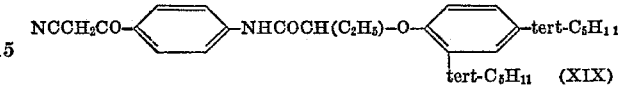

(XIX)

in a mixture of 10 ml. of cresyl phosphate and 20 ml. of ethyl acetate, and adding the resulting mixture to the same silver halide emulsion as in Example 3. The color photographic printing film thus prepared was exposed and processed as in Example 1.

The spectral absorption curve of the black part of the photographic film thus obtained was flat, as in Example 1.

In addition, the couplers used in the above-mentioned examples were prepared by the processes, or by methods similar to the processes disclosed in the following patents:

Coupler (I) and coupler (X): British Pat. No. 1,141,275.
Coupler (II) and coupler (VI): British Pat. No. 979,141.
Coupler (III): Japanese patent publication No. 5547/64.
Couplers (IV), (VIII), (XII) and (XV): Japanese patent application No. 65,830/69.
Coupler (V): British Pat. No. 1,142,553.
Couplers (VII) and (XVI): U.S. Pat. No. 2,801.171.
Coupler (IX): U.S. Pat. No. 3,337,344.
Coupler (XIII): U.S. Pat. No. 3,409,439.
Coupler (XI): U.S. Pat. No. 2,600,788.
Coupler (XIV): U.S. Pat. No. 3,062,653.
Coupler (XVII): Belgian Pat. No. 664,221.

Moreover, coupler (XIX) is a compound described in the specification of British Pat. No. 1,160,524 and is prepared by condensing p-aminocyanoacetophenone and a corresponding acid chloride in acetonitrile.

Coupler (XVIII) was prepared as follows: A mixture of 32 g. of ethyl trifluoroacetate prepared according to the method by F. Swarts; "Chemisches Zentrablat", Vol. I, 996 (1927) and 26 g. of p-nitrophenyl hydrazine was heated to 130° C. for 2 hours. After cooling the product, the crystals precipitated were recovered by filtration and mixed with 10 g. of sodium methylate and 50 ml. of ethanol. The mixture was refluxed for 1 hour and poured in water. When the system was acidified with acetic acid, crystals were precipitated, which were recovered and recrystallized from ethanol-water to provide 23 g. of the crystals of 1-(p-nitrophenyl)-3-trifluoromethyl-5-pyrazolone having a melting point of 130° C. The product was reduced in ethanol at 80° C. under the presence of hydrogen of 50 atms. using palladium-carbon as a catalyst and after removing the solvent by distillation, the reduction product was recrystallized from ethanol-benzene to provide 11 g. of an amine having a melting point of 215° C. To 5.5 g. of the amine were added 7.9 g. of octadecenyl succinic anhydride and 20 ml. of acetic acid and the mixture was heated on a hot water bath for one hour. Thereafter, the product was cooled with the addition of 30 ml. of ethanol to precipitate the crystals, which were recovered and recrystallized from methanol to provide 4.5 g. of the coupler (XVIII). Elementary analysis: Found N 6.94% (calculated 7.08%).

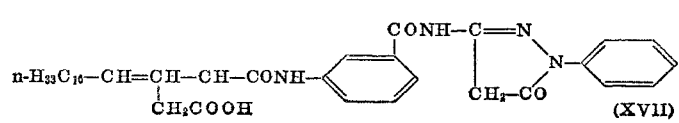

(XVII)

What is claimed is:

1. A multi-layer color photographic light-sensitive positive material comprising a support and silver halide light-sensitive emulsion layers, at least three of which contain couplers capable of forming cyan, magenta and yellow dyes, respectively, at least one light-sensitive emulsion layer of said material containing a coupler selected from the group consisting of a red dye-forming coupler having an absorption maximum at a spectral wave length region of 460 to 520 nm., a blue dye-forming coupler having an absorption maximum at a spectral wave length region of 570 to 640 nm., and a grey dye-forming coupler having absorption maximum at spectral wave length regions of 460 to 520 nm. and 570 to 640 nm., said red, blue and grey dyes being formed selectively at those portions of the image having, in the case of a transparent color photographic material, an equivalent neutral density higher than 1.2 and, in the case of a color reflective material, an equivalent neutral density higher than 0.8.

2. The multi-layer color photographic light-sensitive positive material according to claim 1 wherein said red, blue or grey color-forming coupler is incorporated in a silver halide emulsion layer separately provided from the silver halide emulsion layers containing the couplers forming the cyan, magenta, and yellow dyes, respectively by coupling reactions with the oxidation product of a conventional primary aromatic amine developing agent.

3. The multi-layer color photographic light-sensitive positive material according to claim 2 wherein the sensitivity of the silver halide photographic emulsion containing the coupler forming the red, blue or grey dye is less than ½ the sensitivity of the silver halide emulsion layers containing the cyan, magenta and yellow dye-forming couplers when exposed to the same spectral wave length region.

4. The multi-layer color photographic light-sensitive positive material according to claim 1 wherein said red, blue or grey color forming coupler is incorporated into a silver halide emulsion layer containing one of the couplers forming the cyan, magenta, and yellow dyes, the relative coupling rate of said red, blue or grey color forming coupler being 0.1–0.6 of the coupler forming the cyan, magenta or yellow dye.

5. The multi-layer color photographic light-sensitive positive material according to claim 1 wherein said red-forming coupler is incorporated in the blue-sensitive or green-sensitive silver halide emulsion layer.

6. The multi-layer color photographic light-sensitive positive material according to claim 1 wherein said blue-forming coupler is incorporated in the green-sensitive or red-sensitive silver halide emulsion layer.

7. The multi-layer color photographic light-sensitive positive material according to claim 1 wherein said couplers forming the cyan, magenta and yellow dyes are oil soluble.

References Cited
UNITED STATES PATENTS

| | | | |
|---|---|---|---|
| 2,592,514 | 4/1952 | Harsh | 96—74 |
| 2,688,539 | 9/1954 | Heimbach | 96—74 |
| 2,689,180 | 9/1954 | Friedman | 96—74 |
| 2,805,158 | 9/1957 | Ganguin | 96—74 |
| 3,249,431 | 5/1966 | Jaeken | 96—74 |
| 3,485,627 | 12/1969 | Hellmig | 96—74 |
| 3,497,350 | 2/1970 | Yutzy | 96—22 |

NORMAN G. TORCHIN, Primary Examiner

J. R. HIGHTOWER, Assistant Examiner